(No Model.)
E. A. SPERRY.
CLUTCH FOR SHAFTS.
No. 534,676.  Patented Feb. 26, 1895.
2 Sheets—Sheet 1.
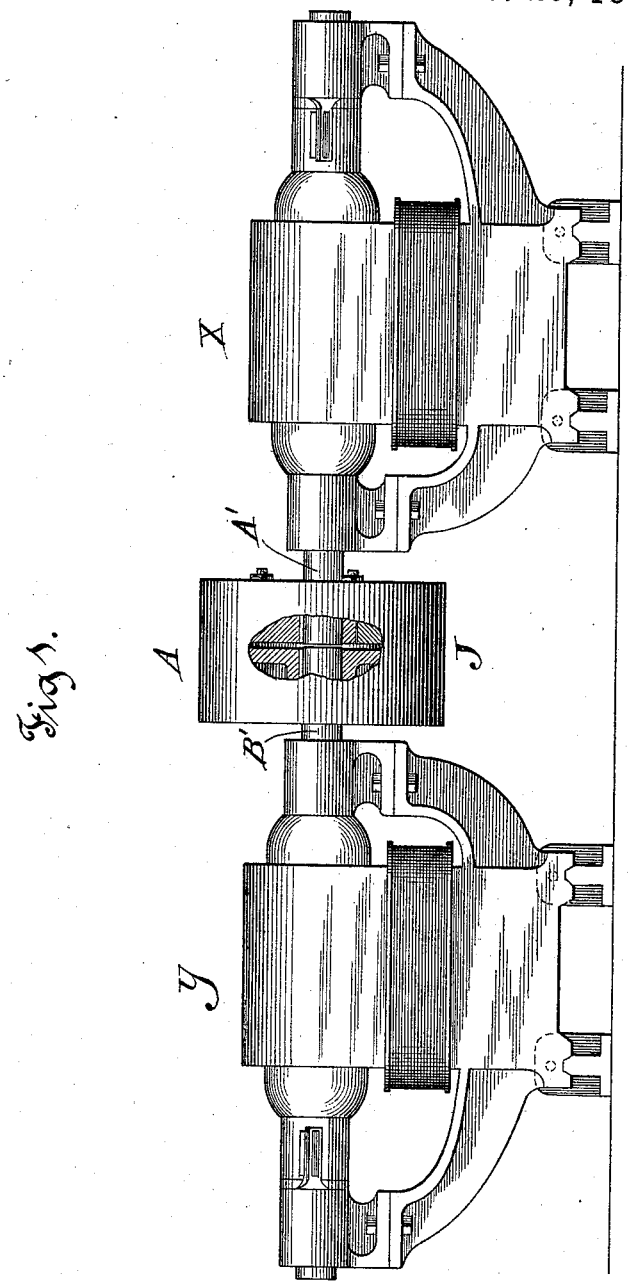
Witnesses
Wm. F. Heming
Wm. N. Rheem
Inventor
Elmer A. Sperry
by Buckingham & Ewart
attys.

(No Model.) 2 Sheets—Sheet 2.
E. A. SPERRY.
CLUTCH FOR SHAFTS.
No. 534,676. Patented Feb. 26, 1895.
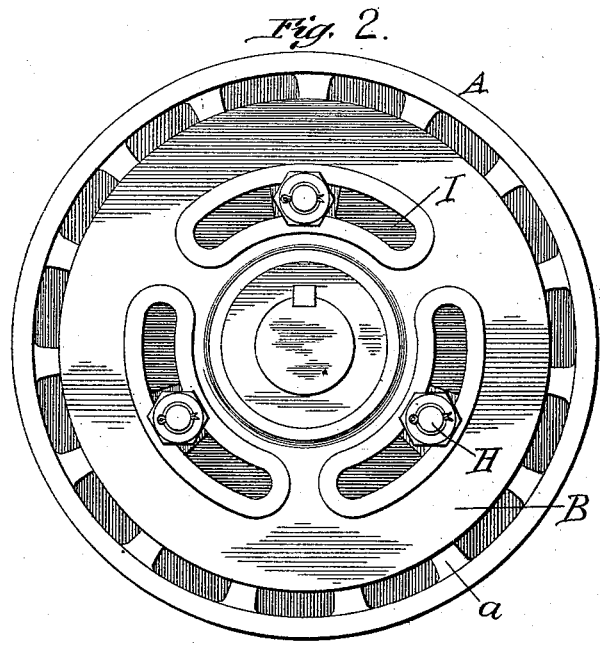
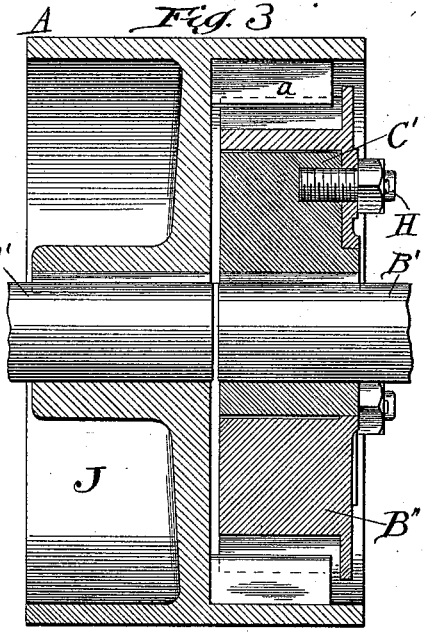
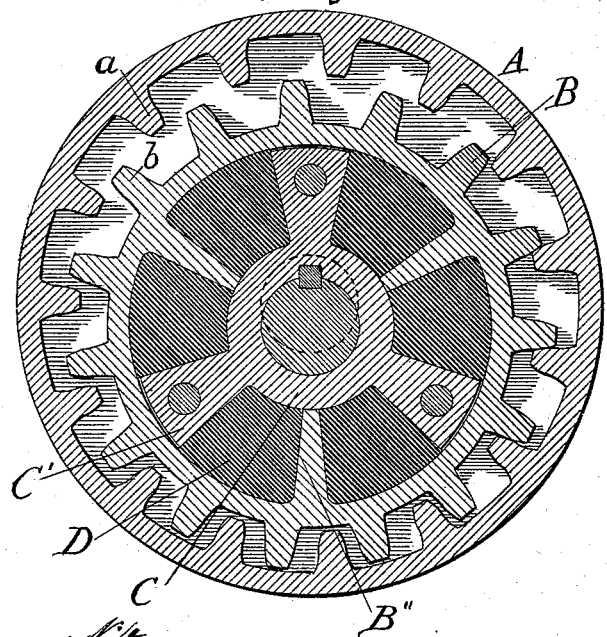
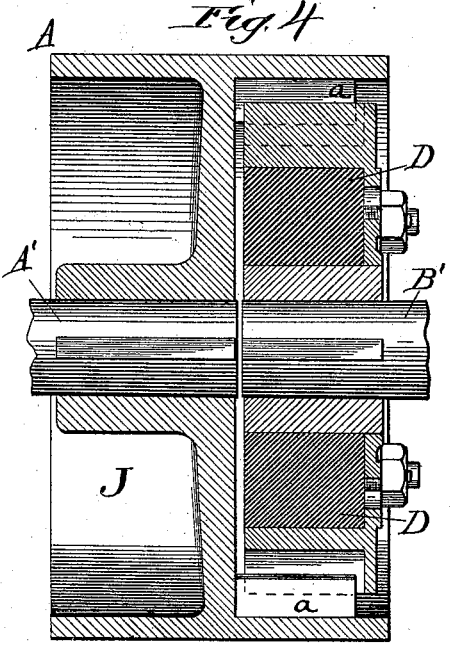

UNITED STATES PATENT OFFICE.

ELMER A. SPERRY, OF CHICAGO, ILLINOIS, ASSIGNOR TO THE SPERRY ELECTRIC RAILWAY COMPANY, OF CLEVELAND, OHIO.

CLUTCH FOR SHAFTS.

SPECIFICATION forming part of Letters Patent No. 534,676, dated February 26, 1895.

Application filed April 29, 1892. Serial No. 431,133. (No model.)

*To all whom it may concern:*

Be it known that I, ELMER A. SPERRY, a citizen of the United States, residing at Chicago, in the county of Cook and State of Illinois, have invented a new and useful Improvement in Clutches for Shafts, of which the following is a specification.

My invention relates to power transmitting devices and consists in details whereby an elastic connection is secured between two rotating elements, and also capacity to transmit motion between axles which are out of alignment one with the other. Many devices have been resorted to to enable one shaft to drive another eccentrically related thereto, but devices employing cranks and links are objectionable from the fact that they tend to wear the shafts on a certain side or at a certain angle from the crank or link and not elsewhere, whereas the device shown in the present invention obviates this entirely, and makes the wear upon all parts on both shafts uniform, allowing them to be kept round and smoothly running under heavy service. This is shown in the accompanying drawings, in which—

Figure 1 is an elevation of the application of the coupling. Fig. 2 is an elevation of the coupling. Fig. 3 is a section on vertical line of Fig. 2. Fig. 4 is a section through the cushions Fig. 2, and Fig. 5 shows the arrangement of parts when the two shafts bear eccentric relation one with the other.

The coupling consists essentially of two elements: an internally-toothed gear A mounted upon one shaft as A' and a spur gear B mounted upon the other shaft, for instance B'. The teeth $a$ and $b$ of each of these gears are like in number so that there is no speed reduction as between the two, but the space between consecutive teeth is much greater than the thickness of the teeth, and in amount about twice the maximum eccentricity occurring between the two axles. The pitch of the diameter of the larger gear with the internal teeth exceeds that of the smaller gear with external teeth also by about twice the maximum required eccentricity of the shafts. Between either or both of these gears and their shafts may be inserted an elastic cushion constructed as follows: Projections as B'' may protrude from one of the gears, and co-operating arms as C' may extend from a hub C with elastic insertions consisting of springs or rubber D between the arms and the projections. The one shown in the figures is located between the smaller gear and its shaft. Bolts H may be used to hold two of these portions together, between which are located the elastic cushions D, the bolts being secured in one of the portions and slots I being provided in the other to allow of the relative movement under strain. A pulley J may be also combined with one of the portions, as is shown.

The two dynamos X and Y are shown mounted upon ways by means of which they can be independently adjusted. One of the functions of the coupling is manifest in this connection, inasmuch as it is not necessary to adjust each dynamo in the same time or amount with the other, as the coupling will allow of the eccentric relation of the shafts. Not only will the eccentric relation be taken up, but the want of parallelism of the shafts will also be compensated for, as the lost motion between the gear teeth will allow this want of alignment without interfering with the proper transmission of power.

It has been found in designing the coupling that there is a certain length or protrusion of the gear teeth which is best, viz: about twice the maximum eccentricity of the two shafts.

The use and operation of the devices will be apparent from the foregoing. The shape of the teeth is such that about three teeth are in contact when the maximum eccentricity exists, and when the shafts are concentric all of the teeth are in contact. The object of the cushion is to relieve whatever jar or vibration there may be when the motion of the revolving parts is reversed, and to lessen the concussive strain. It is evident that pins might be used instead of the teeth, also that a less or greater number of teeth could be used than shown in the drawings, and variations could be made from the exact structure and shape of the parts without departing from the spirit of the invention. Although it is designed to use all these features in connection one with another, yet it is obvious that one or more of them may be used without the others, and the invention extends to such use.

What I claim as new, and desire to secure by Letters Patent, is—

1. A shaft coupling comprising an internally toothed gear wheel and a gear having the same number of teeth, but of a smaller pitch diameter to engage and mesh with said internally toothed gear wheel, said gear wheel and gear being free to move relatively in a radial direction, substantially as shown and described.

2. A shaft coupling comprising an internally toothed gear wheel mounted on a shaft, and a gear wheel mounted on the shaft to be coupled with the first shaft and meshing with the said internally toothed gear wheel and having a smaller pitch diameter, the lost motion between the teeth of the gear wheel being substantially the same as the difference between the pitch diameters, substantially as set forth and described.

3. A shaft coupling comprising an internally toothed gear wheel and a gear wheel of smaller pitch diameter meshing with it, the length of the teeth of both wheels being substantially the same as the difference in their pitch diameters, and being both free to move relatively in a radial direction, substantially as set forth and described.

4. A shaft coupling comprising two parts having interlocking teeth, arranged to provide for a certain amount of lost motion between them, and an elastic connection between one of said parts and the shaft on which it is mounted, substantially as described.

5. The combination with a shaft carrying an internally toothed gear-wheel, A, of a shaft carrying a collar C provided with radial arms C', a gear B smaller than the gear-wheel A and meshing therewith, having internal radial projections B'' and a flange containing slots I concentric with the shaft, cushions D between the arms C' and the projections B'', and bolts H passing through the slots I into the arms C', substantially as set forth.

ELMER A. SPERRY.

Witnesses:
HERBERT E. GOODMAN,
W. R. GOODMAN.